United States Patent [19]
Watt et al.

[11] Patent Number: 4,890,172
[45] Date of Patent: Dec. 26, 1989

[54] AUTOMATIC SERVO GAIN CALIBRATION SYSTEM FOR A DISK DRIVE

[75] Inventors: Charles R. Watt, Shrewsbury; Frederick K. Groll, Rutland; John A. Scaramuzzo, Jr., Natick, all of Mass.

[73] Assignee: Digital Equipment Corporation, Maynard, Mass.

[21] Appl. No.: 250,037

[22] Filed: Sep. 27, 1988

[51] Int. Cl.$^4$ ............................................. G11B 33/00
[52] U.S. Cl. ................................. 360/77.04; 360/69
[58] Field of Search ................ 360/69, 75; 369/47–49, 369/32; 330/279

[56] References Cited
FOREIGN PATENT DOCUMENTS
8802913 4/1988 PCT Int'l Appl. .
1489078 10/1977 United Kingdom .

Primary Examiner—Aristotelis M. Psitos
Assistant Examiner—David L. Robertson
Attorney, Agent, or Firm—Kenyon & Kenyon

[57] ABSTRACT

A method for automatically calibrating gain parameters of a servo control including a track position detector for a computer disk drive. The method generally comprises the step of encoding AB bursts on at least one special calibration track of a disk surface in accordance with a known off center pattern signal having a preselected frequency. Servo correction number information is also encoded on the calibration track to compensate for the off center pattern of the AB bursts. A digital signal processing technique is performed on a correction signal derived from the AB bursts and servo correction number information to detect a residual signal at the preselected frequency of the off center pattern signal. The gain of the track position detector is thereafter adjusted to minimize the magnitude of the residual signal.

11 Claims, 9 Drawing Sheets

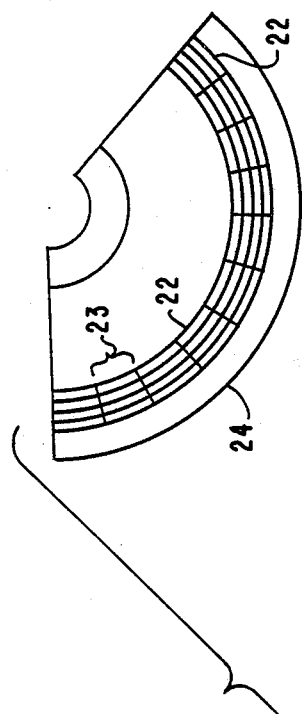
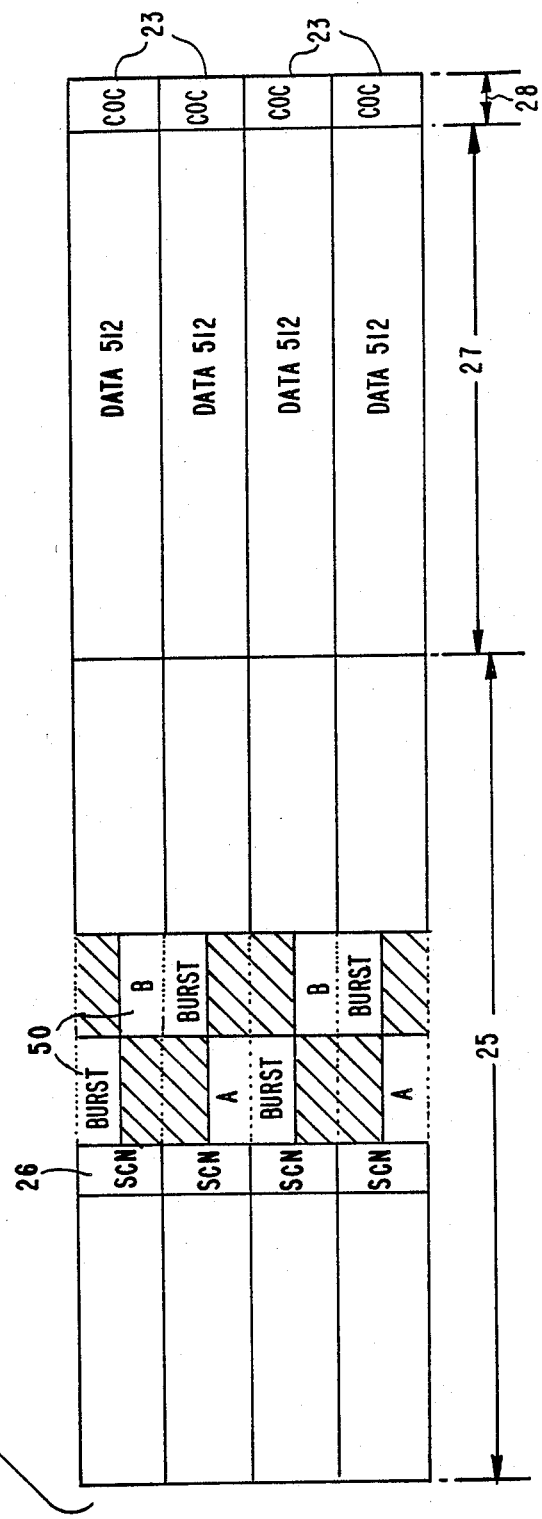
FIG. 2.

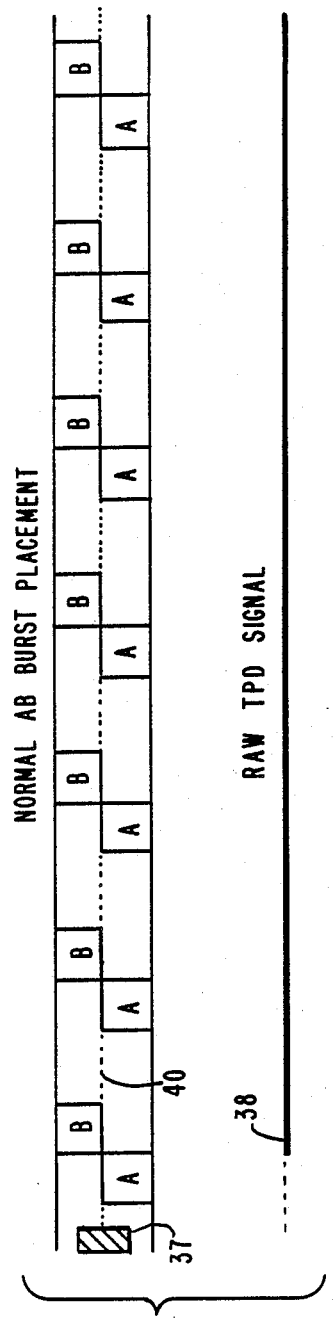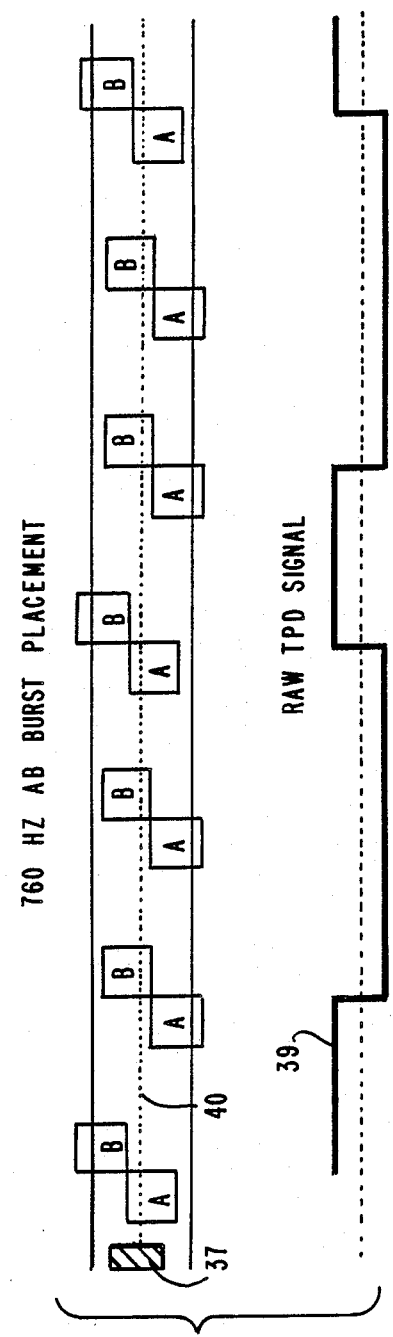

HIGH TPD GAIN

LOW TPD GAIN
(180° PHASE SHIFT)

CORRECT TPD GAIN

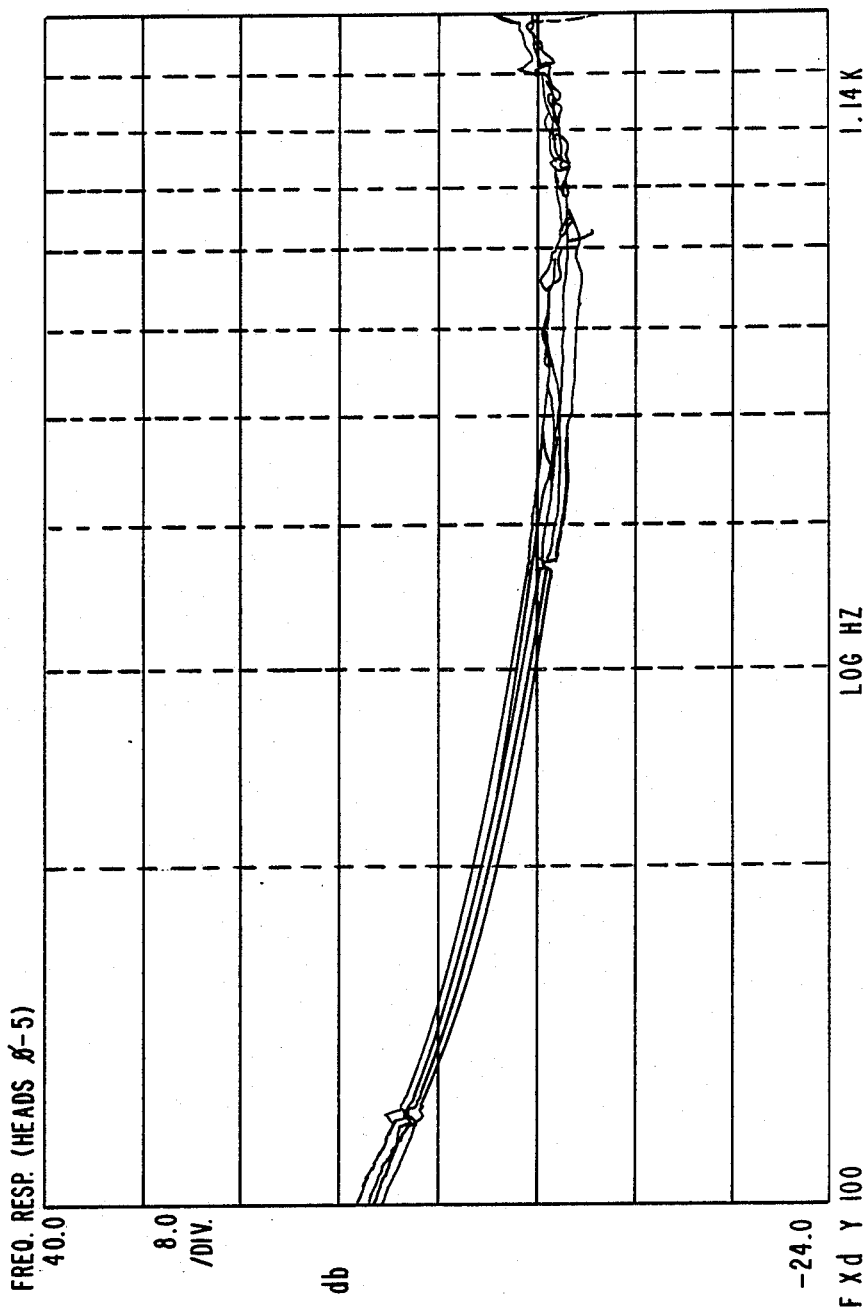

OPEN LOOP GAIN AFTER TPD-CALIBRATION

AUTOMATIC SERVO GAIN CALIBRATION SYSTEM FOR A DISK DRIVE

FIELD OF THE INVENTION

The invention is directed to a disk drive for a computer system and, more particularly, to a system for automatically calibrating the gain of a servo control for correctly positioning a read/write head over the centerline of a preselected track of a disk.

BACKGROUND OF THE INVENTION

Many modern computer systems utilize magnetic disks as an auxiliary storage medium for data. The disks are divided into adjacent circumferentially extending tracks and each track is, in turn, divided into sectors. Each of the sectors contains a data field storing a preselected amount of data, e.g. 512 bytes. A read/write head is positioned over a preselected track while the disk is rotated to encode and/or decode a sequence of magnetic states into each sector of the track directly beneath the head. In this manner, data may be either written onto the disk or read from the disk as a function of the sequence of magnetic states, as is well known. The width of the head is approximately equal to the width of a track. It is critical that the head be precisely aligned with the centerline of the track being written to or read from to make certain that correct data information is being stored onto or read from the magnetic disk. In the event that the head is not properly aligned with a track centerline, the head will straddle two adjacent tracks and encode or decode invalid data information onto or from the two overlapped tracks.

Typically, a plurality of disks are stacked on a common rotating shaft in an axially spaced relation to one another and a rotable arm mounting at least one head at an outer end is positioned over each of the rotating disks. An electromechanical device, such as a dc limited angle motor and voice coil type actuator, is coupled to the arms. The dc limited angle motor moves the arms to position and hold the heads over the respective disks at a preselected angle such that the heads are each aligned with the centerline of a particular track of a respective disk. Generally, one head at a time is operated to encode or decode its respective disk. In modern computer systems, the density of the data stored on the disks is very high resulting in extremely minimal dimensions for the width of each track. Accordingly, it is extremely important that the control mechanism for the limited angle motor operates to precisely control the angular position of the mounted head to coincide with the centerline of a track.

Precise control of the operation of the limited angle motor is obtained by utilizing a servo mechanism. A servo mechanism generally comprises a control mechanism for a device wherein an error signal derived from a summation of a reference input and an actual output is fed back to the control mechanism to correct the performance of the controlled device. In the context of a disk drive, the actual angular position of a head is summed with the desired angular position for the arm mounting the head and the difference is utilized to control the limited angle motor to move the head to the correct angular position. Thus, the limited angle motor is energized to change the angular orientation of an arm until the actual angular position of the head equals the desired angular position, i.e., the error signal is zero.

In accordance with a known servo mechanism for a computer disk drive, position information relating to the head is embedded or written directly on the tracks of each disk between the data fields of adjacent sectors. The head reads the position information as the disk is rotated beneath the head and transmits the embedded information to a track position detector for processing. Accordingly, the head serves as a position transducer component for the servo mechanism. The embedded position information includes A and B bursts encoded on the track adjacent the beginning of each data field. For each data field, one of the bursts is positioned at and above the track centerline and the other burst is spaced in the circumferential direction from the first burst and positioned at and below the track centerline, or vice versa. Each burst comprises a sequence of pulses and the track position detector integrates the signals of the A and B bursts over time to provide integrated $A-B$ and $A+B$ analog signals. The output of the track position detector is defined as $A-B/A+B$.

If the head is properly positioned over the centerline of a track, the integration value for each of the A and B bursts should approximately equal one another and $A-B/A+B$ should equal zero. The $A-B/A+B$ ratio is a proportionality number representative of a unit of measure of track position from the centerline.

In the embedded servo technology utilized in disk drive servo controls, the AB bursts are position references which permit the head to relate position error from centerline of the track. The AB bursts are encoded on the disks by a servo writer which utilizes an external transducer such as a laser interferometer to precisely position the servo writer head relative to the centerline. However, due to vibrations, spindle bearing runout and other factors, the servo writer does not write the AB bursts exactly on the centerline.

Accordingly, after the encoding of the AB bursts by the servo writer on a track, the servo writer positions itself over the centerline of the track by the interferometer and measures any misplacements of the AB bursts from the centerline caused by the disturbances during the writing of the AB bursts. The measurement information is recorded in each sector of the track adjacent the actual AB bursts as a Servo Correction Number. The Servo Correction Number is read by the head during normal operation of the disk drive and is provided to the servo control system to compensate for any off center readings of the AB bursts caused by misplacements which occurred during the servo writer operation.

A significant problem associated with the embedded servo technology described above is that the system requires a tight control over the track position detector gain and servo control feedback loop gain for satisfactory performance. This is particularly true when the data is stored on the disks in a high density configuration which requires a very precise, high performance control of head position and also, when the disk drive components are mass-produced with normal manufacturing tolerances.

SUMMARY OF THE INVENTION

It is a primary objective of the present invention to provide an automatic track position detector and loop gain calibration system to accurately calibrate the servo system gain parameters for optimized, high performance operation. The invention provides calibration of both the track position detector gain and overall servo control loop gain. Variations in the head width and read channel electronics cause different and erroneous track position detector gains. Moreover, variations in servo loop control electronics and mechanical components of the disk drive can result in a overall servo loop gain variation which is unacceptable. These loop gain variations are due to manufacturing tolerances independent of the track position detector gain. Calibration of the track position detector gain and the overall servo control loop gain is necessary to eliminate gain errors caused by varying head dimensions, manufacturing tolerances, etc. to thereby ensure high performance servo control and to maintain servo stability.

In accordance with the invention, proper track position detector gain is calibrated by utilizing the AB bursts and servo correction number information embedded in a special calibration track written on each disk surface. More specifically, at least one track on each disk surface of the disk drive is reserved for calibration purposes. During the writing of the AB bursts by the servo writer, the placement of the AB bursts on the calibration track is intentionally displaced from the centerline in accordance with a known pattern, e.g. a 760 Hz assymetric square wave. The servo correction number for the calibration track are determined and embedded between data fields of the calibration track so as to correct the 760 Hz square wave distortion of the AB burst placement.

The calibration is initiated by a head tracking one of the special servo written calibration tracks. The head reads the AB bursts and the track position detector processes the AB burst signals, as will be described in more detail in the following Detailed Description section, to provide a "raw" track position signal corresponding to the misplaced AB bursts, as encoded by the servo writer. The "raw" position signal is summed with the servo correction numbers for the calibration track to correct the off center readings provided by the AB bursts. If the summation equals zero, i.e., the raw position information equals the servo correction number information, then the entire displacement indicated by the head reading of the AB bursts is the intended servo writer disturbance of the AB positions on the calibration track.

A significant aspect of the track position detector gain calibration system of the present invention is the recognition that the servo correction number information is equal and opposite to the raw position information for the calibration track when the gain of the track position detector is properly calibrated. Thus, any residual 760 Hz square wave signal remaining after the summation of the servo correction numbers and the raw position information would be attributable to factors relating to an incorrect track position detector gain. Pursuant to the invention, a digital signal processing technique, such as a discrete Fourier transform, is applied to the signal derived from the summation of the servo correction number and raw position information to detect a residual signal at the 760 Hz disturbance frequency. A convergence algorithm operates through iterations, i.e., after a raw position information and servo correction number summation for all sectors of the calibration track being tracked by the head, to minimize the 760 Hz component of the summation of the raw position information and the servo correction number. More specifically, in a preferred embodiment of the invention, a microprocessor in the servo control system performs the discrete Fourier transform for an average of the summation determined during traversal of all the sectors of the calibration track by the head during several revolutions of the disk to detect any residual 760 Hz disturbance signal. The microprocessor then operates to adjust the gain of the track position detector to tend to minimize the 760 Hz residual signal and repeats the digital signal processing and gain adjustment in iterations during successive revolutions of the disk until the 760 Hz component of the summation average is minimized. When the 760 Hz component has been minimized, the gain of the track position detector will be optimized for AB burst and servo correction number position reference processing.

In accordance with another feature of the invention, the gain of the overall servo control loop, comprised of the track position detector and other components of the entire servo control feedback loop, is automatically calibrated for optimized performance of the servo control by measuring and compensating for system gain errors at a frequency which is representative of the servo bandwidth of the disk drive. This disturbance frequency is determined experimentally for the disk drive system. For example, in a prototype disk drive embodying the present invention, the desired servo bandwidth was found to be 330 Hz.

Pursuant to the invention, the microprocessor performs a single frequency Bode plot at the determined servo bandwidth and adjusts the overall loop gain through iterations until the gain of the loop at the servo bandwidth frequency, as determined in a Bode plot, is 1 (0 dB in the Bode plot). A digital sine wave signal having a frequency equal to the servo bandwidth, e.g. 330 Hz, and an amplitude equivalent to ±10% of a track is summed at a summing junction in the loop with the control signal generated by the servo control and the microprocessor performs a single frequency discrete Fourier transform at 330 Hz to obtain the magnitude and phase of each of the input to the summing junction and the output of the summing junction at 330 Hz. The 330 Hz sine wave signal is then turned off and the microprocessor repeats the single frequency discrete Fourier transform at 330 Hz. The result of the discrete Fourier transform at 330 Hz with the 330 Hz signal turned off represents "noise" in the system at 330 Hz.

The Bode plot and gain adjustment is performed by the microprocessor after the result of the discrete Fourier transform without the 330 Hz signal is complexly subtracted from the result of the discrete Fourier transform with the 330 Hz sine signal applied to the summing junction, as determined during that iteration. The value of the adjustment to the overall loop gain is adjusted, once each iteration, as a function of the ratio of the summing junction output over the summing junction input at 330 Hz after the complex subtraction, until the adjustment value of an iteration equals the adjustment value of the previous iteration. The loop gain determination at the summing junction will be a proper loop gain for the overall system when the two adjustment values are equal. More specifically, the Bode plot will have a 0 dB gain at 330 Hz.

In accordance with yet another feature of the invention, the automatic track position detector gain calibration and automatic overall control loop gain calibration are performed in conjunction with one another in respect of a disk drive including a plurality of disks with a different head for each disk surface, as described above, to improve the speed of operation of the calibration system. In such a disk drive, the track position detector gain may be erroneous due to the particular head operating at any one time.

Inasmuch as the performance of the track position detector gain calibration is a relatively slow operation, (i.e., it takes a relatively long time to converge on a minimized 760 Hz residual signal), it is generally preferable to measure and calibrate the overall loop gain. The only difference in the servo loop gain as between different disk surfaces is the different heads with all of the other components of the control loop being common to the control of all of the disks. Accordingly, the automatic calibration of the track position detector gain is performed for only one of the heads. Thereafter, the overall loop calibration system is used to calibrate the loop gain for the remaining disk surfaces and their heads with only the gain of the track position detector being adjusted to obtain a 0 dB gain at the 330 Hz frequency. This will properly calibrate both the track position detector gain and overall loop gain for all the disk surfaces since the only difference in the servo system as between different disk surfaces in the stack is the heads and the adjustment to obtain 0 dB at 330 Hz for the remaining disk surfaces after the one track position detector gain calibration is achieved solely by adjusting the track position detector gain within the servo control loop.

For a better understanding of the above and other features and advantages of the present invention, reference should be made to the following Detailed Description and to the accompanying drawings.

BRIEF DESCRIPTION OF THE DRAWINGS

FIG. 2 is a detailed illustration of a disk surface including an enlarged view of one portion of a track of the disk.

FIGS. 4a, b each illustrate servowritten AB bursts in an embedded disk.

DETAILED DESCRIPTION

Figure 1:
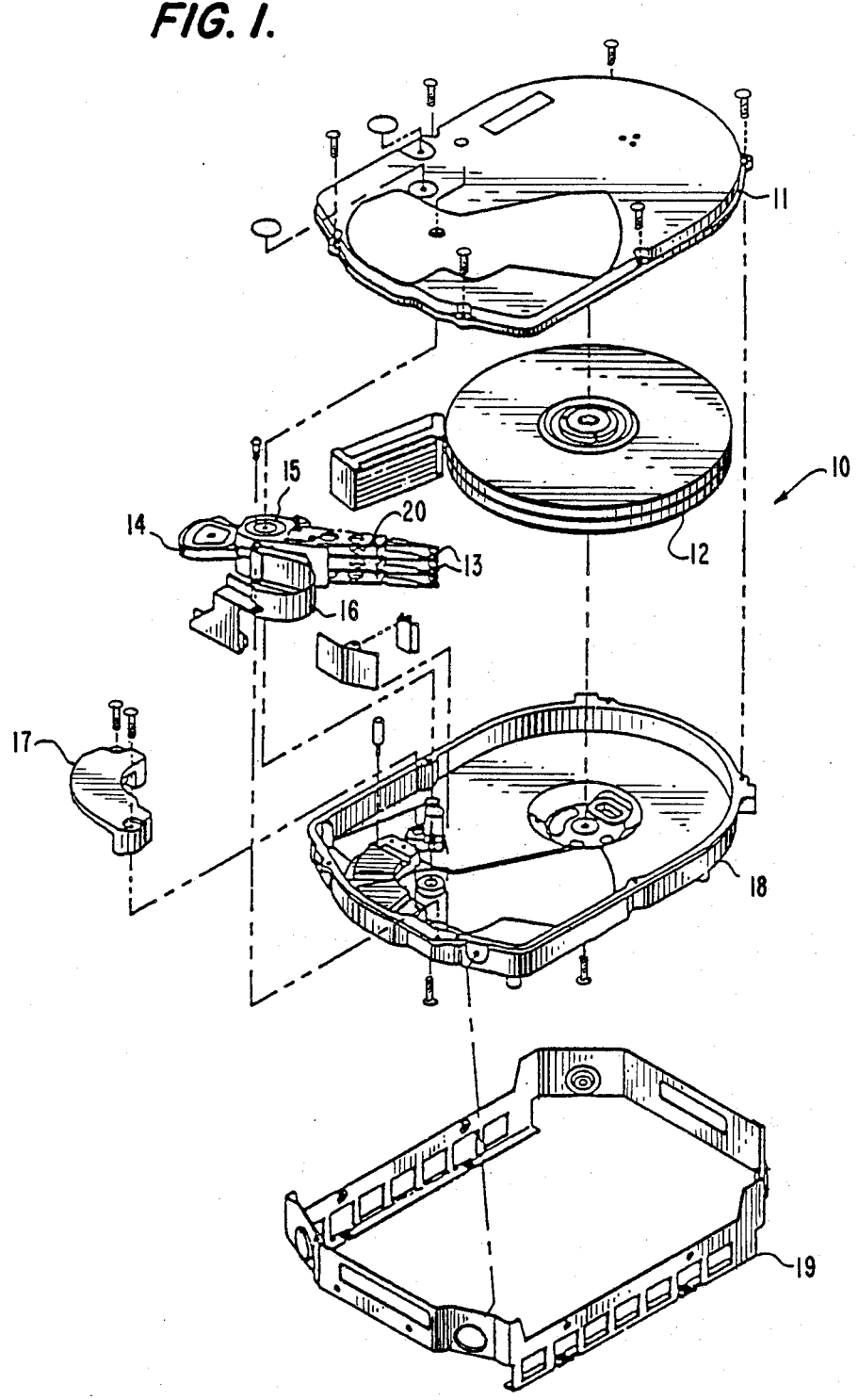
FIG. 1 is an exploded perspective view of a disk drive system.

Referring now to the drawings and initially to FIG. 1, there is illustrated, an exploded perspective view of a disk drive system. The system 10 is contained in a chassis 19. The components of the system 10 sit in a lower housing 18. The lower housing 18 components comprise three disks 12, a dc limited angle motor 14, a voice coil type actuator 15, at least three heads 13, three arms 20, a flex cable 16 and a cap 17. The lower housing 18 is covered by a cover plate 11 and sits in the chassis 19.

While FIG. 1 depicts a disk drive system with three disks, a typical disk drive system may contain, for example, eight disks.

The disks 12 are stacked on a common rotating shaft in an axially spaced relation to one another. The dc limited angle motor 14 and voice coil type actuator 15 are coupled to the arms 20. The heads 13 are also coupled to the arms 20. The motor 14 and actuator 15 control the position and hold each of the heads 13 over a respective disk 12.

The precise control of the limited angle motor 14 is accomplished by a signal applied to the flex cable 16 from a servo control as will be described. This flex cable 16 couples the dc limited angle motor 14 to the servo control.

The entire assembly of the arms 20, dc limited angle motor 14, heads 13, and voice coil type actuator 15 are held in the lower housing 18 by the cap 17.

Referring to FIG. 2, there is illustrated a detailed view of a disk surface including an enlarged view of one section of the disk. Each disk is divided into adjacent circumferential tracks. The tracks are further divided into sectors.

FIG. 2 depicts a cross section of a disk 24 with the track and sectors shown. Further, an enlarged portion of the disk is shown to illustrate the individual sectors 23 of several adjacent tracks 22.

The information contained in each sector can be divided into three groups. First is the header 25 which contains such information as the servo correction number (SCN) 26 as described above. Second is the data field 27 which contains, for example, 512 bytes of data. The last field 28 contains such information as the error correction code used for error detection. The AB bursts 50 are also positioned in the header of each sector, as illustrated.

Figure 3A:
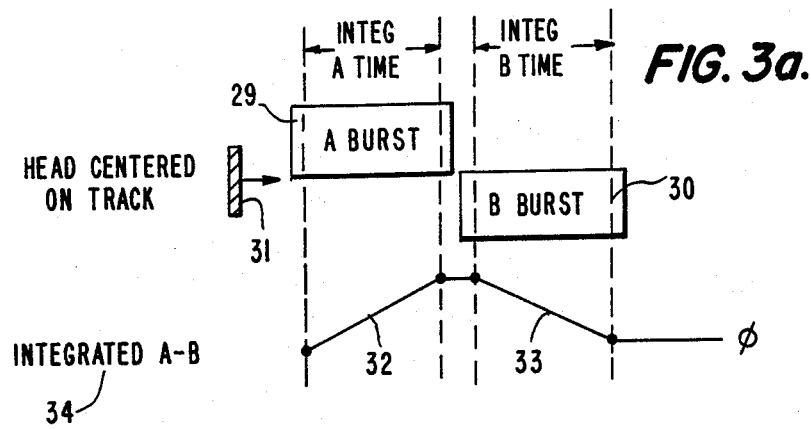
FIGS. 3a, b, c are graphic illustrations of a head position determination in an embedded servo control system.
Figure 3B:
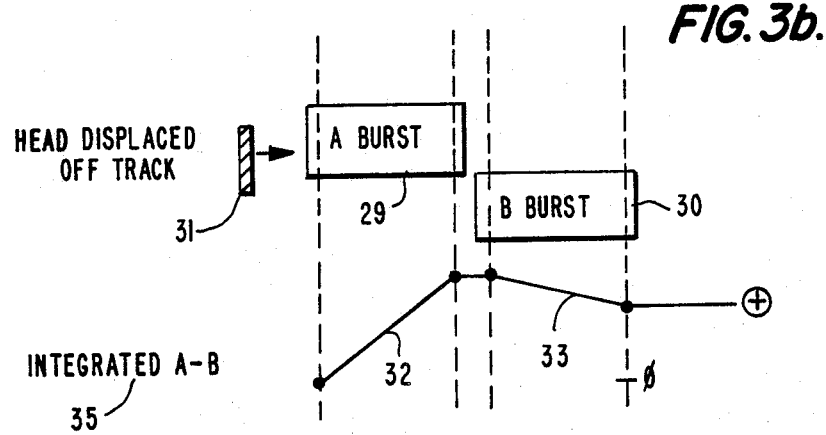
Figure 3C:
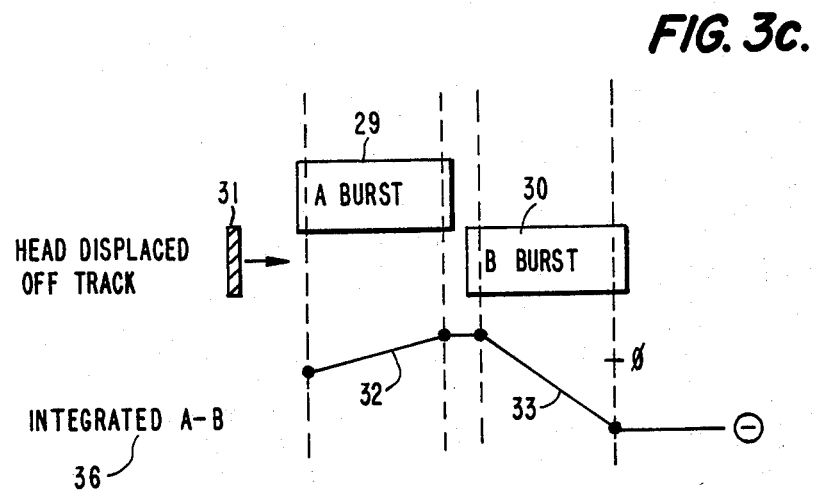

FIG. 3(a)-(c) are graphic illustrations of a head position determination in an embedded servo control system of the type depicted in FIG. 2. Each figure depicts the head 31 in different positions with respect to the centerline of the track. Also illustrated are the resulting waveforms from the integration of the A 29 and B 30 burst signals over time.

The embedded position information relating to the head includes A 29 and B 30 bursts encoded on the track. For each data field as shown in the figures, one burst is positioned at and above the track centerline and the other burst is at and below the track centerline.

As shown in FIG. 3(a), the head 31 is centered on the centerline of the track. As the head travels across the track, the system integrates over time resulting in the waveform 34. Thus, when A 29 and B 30 burst are integrated over time by the servo control system, the resulting waveforms 32 and 33 respectively, indicate a summed integration value of zero. This means that the head 31 is properly positioned over the centerline of the track.

In FIG. 3(b), the head 31 is displaced above the centerline of the track. As the head travels across the track the integrated A−B waveform 35 shows A burst integrated curve 32 more positive than the B burst integrated curve 33. The resulting summed integrated value is a positive number which indicates that the head is above the centerline of the track.

In FIG. 3(c), the head 31 is displaced below the centerline of the track. As the head 31 traverses the track the system calculates the integrated A−B value resulting in the waveform 36. In this case, the B burst integrated curve 33 results in a more negative value than the A burst integrated curve 32. The sum, therefore, is negative indicating that the head 31 is below the centerline of the track.

FIGS. 4(a)-(b) illustrate servo written AB bursts in an embedded disk. FIG. 4(a) illustrates the head 37 in position over the centerline 40 of a track. The AB burst placement is in a normal pattern of an A burst immediately below the centerline 40 and a B burst immediately after the A burst and above the centerline 40. The resulting raw position signal 38 (the integration value of A−B) is a straight line waveform indicating the correct positioning of the head 37.

FIG. 4(b) depicts the placement of the AB bursts as written in a special calibration track of each disk surface in accordance with the invention. The head 37 is positioned over the centerline 40 of the track. The AB bursts, however, are not placed symmetrically with respect to the centerline 40. Instead, they are placed asymmetrically to the centerline 40, for example, in accordance with a 760 Hz asymmetric square wave.

The resulting raw position signal which is read by the head 37 will be an asymmetrical square wave 39 indicating the raw position error of the head 37.

While the head 37 is reading this signal, it is also reading the servo correction numbers for the calibration track sectors. The resulting servo correction number waveform for the calibration track should be the inverse of the raw position signal 39. The two signals are summed to obtain the proper position information. The result of the summation will be a corrected position signal similar to the raw position signal depicted in FIG. 4(a).

Figure 5:
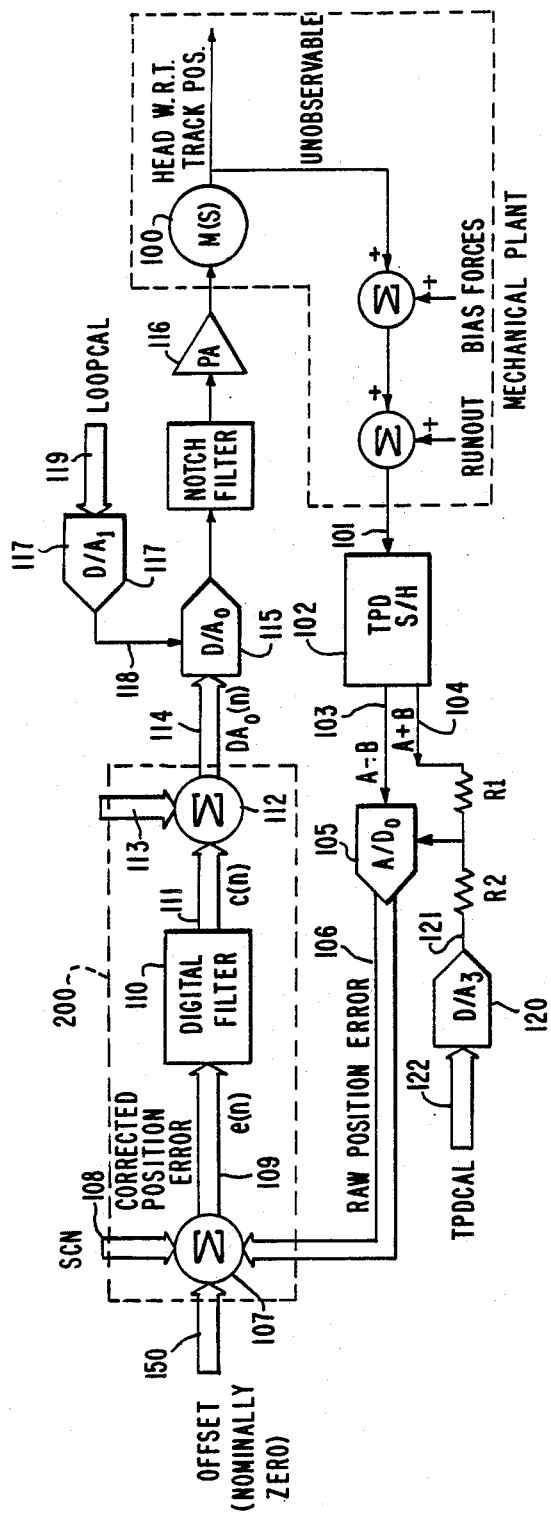
FIG. 5 is a block diagram of a servo control loop including the automatic gain calibration system of the invention.

Referring now to FIG. 5, there is illustrated, in block diagram form, a servo control system for controlling the coil actuator and dc limited angle motor to precisely position the heads over the tracks of the disks. The heads of the electromechanical system 100 (which includes the voice coil actuator, limited angle dc motor, arms and heads, as described above) are all coupled to an output line 101 to transmit AB bursts, decoded by an operating head, to a track position detector 102. The track position detector 102 integrates each of the A and B sets of pulses to obtain A and B position values. The track position detector 102 then calculates A−B and A+B values.

A signal representing A−B is output on line 103 and a signal representing A+B is output on line 104. The line 103 is coupled to an input of an analog-to-digital converter 105 and the line 104 is coupled to a reference port of the analog-to-digital converter 105. In this manner, the analog-to-digital converter 105 will output a digital signal on line 106 which is representative of the ratio A−B/A+B. The ratio A−B/A+B is the track position detector output. This ratio provides the raw position error information of an operating head relative to the centerline of a track of the corresponding disk. The analog-to-digital converter 105 is preferably an 8-bit converter such that the digital signal for track width is 512 counts per track. If the track position detector is properly calibrated, the raw position error information will be an indication of position from centerline in proportion to a 512 count per track digital signal.

The line 106 is coupled to a summing junction 107 of a microprocessor 200. A line 108 is also coupled to the summing junction 107 to input the servo correction number decoded by the operating head to correct the raw position information such that the output (e(n)) of the summing junction 107 on line 109 indicates a corrected digital count relative to the track centerline. A line 150 is also coupled to the summing junction 107 to input offset from centerline information. Ordinarily, the offset from centerline is zero since it is the objective of the system to position the heads over a centerline.

The line 109 is coupled to an input of a digital filter 110 of the microprocessor 200 which provides an output signal c(n) on line 111 suitable for control of the coil actuator. More specifically, e(n) represents the "error" between the actual position of the head determined from the embedded servo information decoded by the operating head, and the desired position, i.e., the digital count representing the track centerline (the offset input on line 150) and c(n) is a correction based on e(n). The line 111 is coupled to a summing junction 112 also in the microprocessor 200. The output ($DA_0(n)$) of the summing junction 112 is input via line 114 to a digital-to-analog converter 115.

The digital-to-analog converter 115 converts the digital count ($DA_0(n)$) representing the correction of the head relative to the track centerline to an analog signal for controlling the coil actuator of the dc limited angle motor as is known. The analog output of the digital-to-analog converter 115 is input to a power amplifier 116 which, in turn, drives the coil actuator to correctly position the operating head over the track centerline.

In accordance with the invention, a digital-to-analog converter 117 is coupled to a reference port of the digital-to-analog converter 115 by a line 118 such that the analog output of the digital-to-analog converter 117 operates to adjust the analog output of the digital-to-analog converter 115 as a function of the output of the digital-to-analog converter 117. In this manner, the overall gain of the control loop, defined by the components illustrated in FIG. 5, can be adjusted and thereby calibrated. A LOOPCAL signal is input to the digital-to-analog converter 115 on line 119 to set the amount of adjustment of the overall loop gain, as will be described below.

Also in accordance with the invention, a digital-to-analog converter 120 is coupled to the reference port of the analog-to-digital converter 105 via the line 104 by means of a line 121. Thus, the analog output of the digital-to-analog converter 120 is summed with the analog A+B value calculated by the track position detector 102 and thereby affects the track position detector gain. Accordingly, the digital-to-analog converter 120 is operable to adjust the gain of the track position detector 102 by a TPDCAL signal. The TPDCAL signal is input on a line 122 coupled to the input of the digital-to-analog converter 120.

Both the LOOPCAL and TPDCAL signals are generated by the microprocessor 200 in accordance with the invention to automatically calibrate the overall loop gain and the track position detector gain. In connection with the TPDCAL signal, the microprocessor 200 performs a convergance algorithm through iterations, one iteration per twenty five averaged revolutions of the disk surface being read, to minimize the 760 Hz component of the c(n) signal. As discussed, the track position detector gain is correct when the 760 Hz component of c(n) is minimal.

After the operating head decodes the AB burst and servo correction number information embedded on the sectors of the calibration track and the digital filter 110 calculates c(n), the microprocessor 200 performs a digital signal processing technique, such as a discrete Fourier transform at 760 Hz, on an average of twenty five revolutions of the c(n) signal. The microprocessor 200 then generates a digital signal (TPDCAL) based on the phase of the residual 760 Hz component determined through the discrete Fourier transform.

Figure 6A:
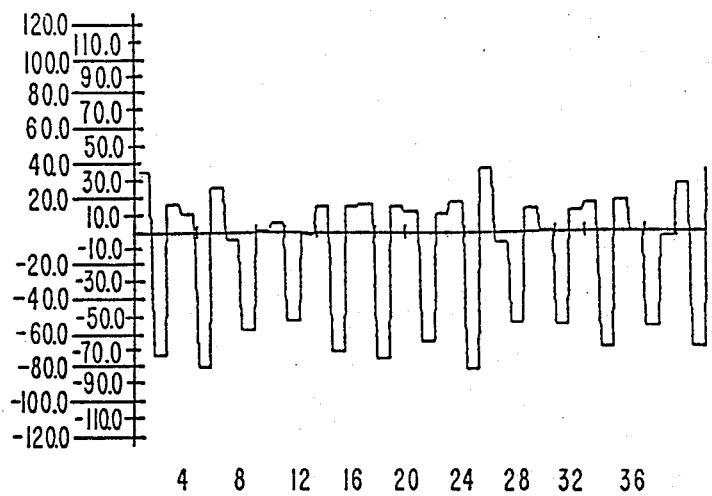
FIGS. 6a, b, c are graphs illustrating 760 Hz signals for high, low and correct track position detector gains.
Figure 6B:
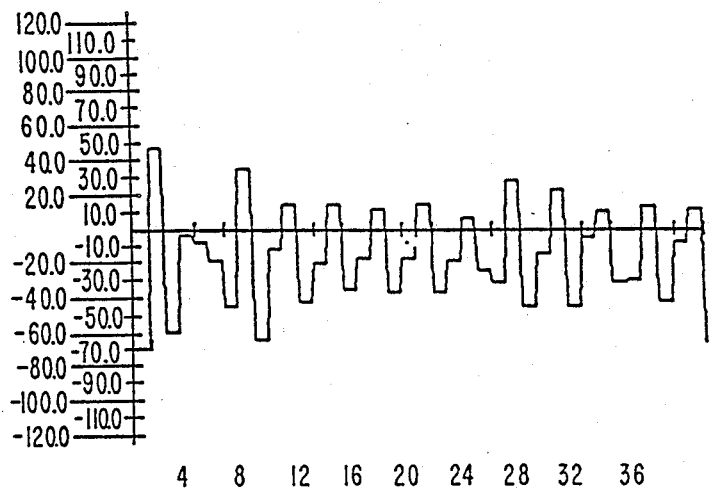
Figure 6C:
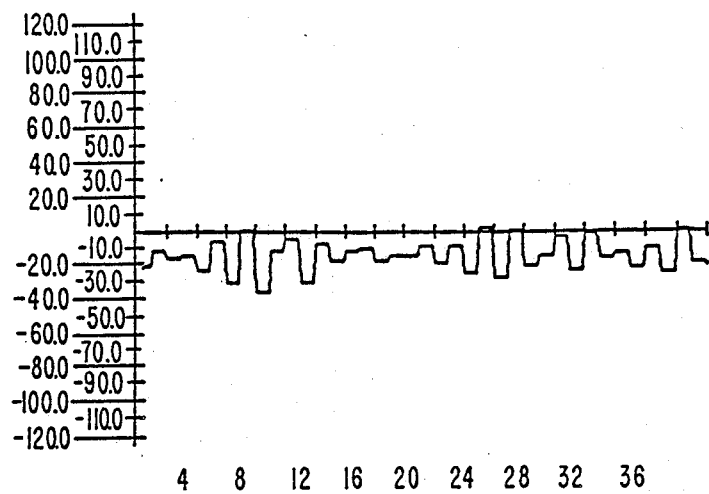

Referring now to FIGS. 6 (a)-(c), there is illustrated, in graph form, typical residual signals at 760 Hz when the gain of the track position detector 102 is high, low and correct, respectively. It should be noted that the 760 Hz signal, when the track position detector gain is low, is 180° out of phase with the 760 Hz signal which occurs when the track position detector gain is high. Ideally, the 760 Hz signal is zero when the gain for the track position detector 102 is correct. However some residual 760 Hz signal always remains and the microprocessor 200 seeks to minimize the 760 Hz signal, as illustrated in FIG. 6(c).

Accordingly, the phase of the 760 Hz signal indicates to the microprocessor 200 whether the gain of the track position detector 102 is too high or too low and the microprocessor 200 generates a TPDCAL signal acting to raise or lower the track position detector gain as a function of the phase of the 760 Hz residual signal determined through the discrete Fourier transform. Unfortunately, the track position detector gain is very non-linear and a known change in the A−B/A+B ratio will not result from a known TPDCAL signal. Thus, the microprocessor 200 merely generates a TPDCAL signal at a certain digital count which will tend to either increase or decrease the gain via the digital-to-analog converter 120, depending on the phase of the 760 Hz signal.

The microprocessor 200 repeats the discrete Fourier transform and TPDCAL signal generation, in iterations, for successive groups of twenty five averaged revolutions until the phase of the 760 Hz component of c(n) changes sign, indicating that the gain has gone from too high to too low or vice versa. After a phase change on the 760 Hz signal, the microprocessor 200 changes the direction of gain adjustment through the digital-to-analog converter 120 by a second smaller digital count, as the amplitude of the 760 Hz signal is now close to zero, and continues the iterations to converge on a minimal 760 Hz signal. When the 760 Hz signal is of a preselected minimal amount, as illustrated in, for example, FIG. 6(c), the calibration is complete and the gain of the track position is properly calibrated. In a preferred embodiment, the microprocessor 200 will increment the adjustment to track position detector gain by 10 digital counts per iteration until a sign change in the 760 Hz component is detected. The microprocessor 200 will then increment by one digital count in the opposite direction until another sign change is detected. At the detection of the second sign change, the calibration is complete inasmsuch as a sign change with one digital count incremental adjustment to the gain of the track position detector via the digital-to-analog converter 120 indicates that the 760 Hz component is close to zero.

In order to generate the LOOPCAL signal for calibration of the overall loop gain, the microprocessor 200 seeks a Bode plot of loop gain in dB versus frequency such that the open loop gain of the system, i.e. $c(w)/DA_o(w)$, equals one at 330 Hz (the desired frequency bandwidth, as discussed above). The microprocessor 200 performs a single frequency discrete Fourier transform at 330 Hz of twenty five averaged revolutions of each of $c(n)$ and $DA_o(n)$. The microprocessor 200 repeats the discrete Fourier transform at 330 Hz of each of $c(n)$ and $DA_o(n)$ with a known 330 Hz sine wave signal introduced into the system, in the example through a line 113 at the summing junction 112. The microprocessor 200 then performs a complex subtraction of the first discrete Fourier transform from the second discrete Fourier transform to yield $c(w)=c(w)-noise(w)$ and $DA_o(w)=DA_o(w)-noise(w)$ and generates a LOOPCAL signal such that the value of the digital-to-analog converter 117 output signal for a particular iteration equals the previous value of the output times the absolute value of the ratio of $DA_o/c(w)$ for that iteration. The microprocessor 200 continues the calculations through iterations, one per twenty five averaged revolutions of $c(n)$ and $DA_o(n)$ until the absolute value of the ratio of $DA_o(w)/c(w)$ equals one. At that point, the open loop gain for the system at 330 Hz is equal to one and the overall loop gain is correctly calibrated.

When the disk drive includes several disks, each with its own set of heads, as illustrated in FIG. 1, the loop gain and track position detector gain calibration can be performed in conjunction with one another to speedily calibrate the disk drive track position detector gain for all of the disk surfaces. A track position detector gain calibration is performed in accordance with the invention for one of the disk surfaces by means of that disk's calibration tracks. The open loop gain Bode plot process of the microprocessor 200 is performed for the calibrated disk to measure the gain of the loop at 330 Hz.

Figure 7B:
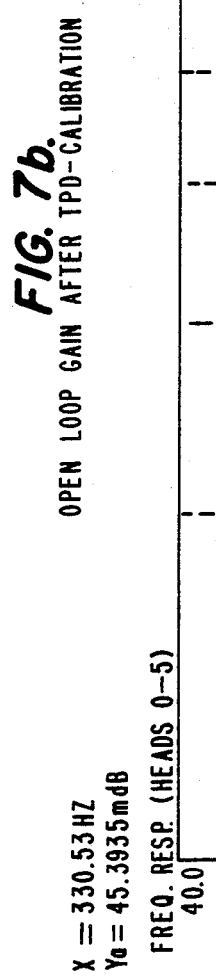
FIGS. 7a, b are graphs illustrating the combined track position detector gain and loop gain calibration of the invention for a multiple disk drive system.

Referring now to FIG. 7a, it can be seen that the Bode plots for the various disk surfaces, before calibration of the track position detector gain, are displaced from one another. However, as can be seen in FIG. 7b, the Bode plots for the various disk surfaces converge on a single plot after the track position detector gains for the loop, relevant to each of the different heads of the respective disk surfaces, have been calibrated. Thus, after one of the heads has been calibrated and its open loop gain at 330 Hz measured, the track position detector gains for the remaining disks can be adjusted via the digital-to-analog converter 120 by measuring the loop gain for each of the other disk surfaces and adjusting the track position detector gain for that disk surface until the loop gain equals the loop gain of the calibrated disk surface at 330 Hz. The non-linearity of the track position detector gain, as previously mentioned, is overcome by an experimentally derived equation that relates fraction gain errors to counts of the digital-to-analog converter 120, $K \cdot (x/1-x)$ where x is fraction gain error.

Following completion of the track position detector calibration, all surfaces will have the same but uncalibrated loop gain. A single loop gain calibration on any disk surface will calibrate the loop gain for all surfaces to equal 0 dB at 330 Hz.

What is claimed is:

1. A method for automatically calibrating gain parameters of a servo control for a computer disk drive device, the servo control including embedded servo information consisting of paired A and B offset bursts and a track position detector, the method comprising the steps of:
   encoding a series of AB bursts on a calibration track on a disk surface of the disk drive device in accordance with a known off center pattern signal having a preselected frequency;
   encoding servo correction number information on the calibration track to compensate for the off center pattern of the AB bursts;
   decoding the AB bursts and servo correction number information of the calibration track during a revolution of the disk surface;

summing signal information derived from the decoding of the AB bursts with signal information derived from the servo correction number information to generate a correction signal;

performing a digital signal processing technique on the correction signal to detect a residual signal having the frequency of the off center pattern signal; and adjusting the gain of the track position detector to minimize the magnitude of the residual signal.

2. The method of claim 1 wherein the steps of claim 1 are repeated in iterations to converge on a minimum magnitude for the residual signal.

3. The method of claim 1 wherein the step of performing a digital signal processing technique is carried out by performing a discrete Fourier transform on the correction signal at the frequency of the off center pattern signal.

4. The method of claim 1 wherein the known off center pattern signal in an assymetric square wave signal.

5. The method of claim 4 wherein the frequency of the assymetric square wave signal is 760 Hz.

6. A method for automatically calibrating gain parameters of a servo control for a computer disk drive device, the servo control including embedded servo information, the method comprising the steps of:

determining a servo bandwidth frequency of the disk drive device;

providing a summing junction in the servo control;

performing a digital signal processing technique on each of a correction signal input and correction signal output of the summing junction at the servo bandwidth frequency to obtain a first result for each of the summing junction input signal and output signal;

loading a known reference signal having a frequency equal to the servo bandwidth frequency and a preselected amplitude into the summing junction;

performing a digital signal processing technique on each of the input signal and output signal of the summing junction during the loading of the known reference signal into the summing junction at the same bandwidth frequency to obtain a second result for each of the summing junction input signal and output signal;

complexly subtracting the first result from the second result to obtain a third result for each of the summing junction input signal and output signal;

adjusting the gain of the servo control as a function of a ratio of the third result for the summing junction output signal over the third result for the summing junction input signal; and repeating each of the above steps through iterations until the ratio is equal to one.

7. The method of claim 6 wherein each of the steps of performing a digital signal processing technique is carried out by performing a discrete Fourier transform at the servo bandwidth frequency.

8. A method for automatically calibrating gain parameters of a servo control for a computer disk drive device, the servo control including embedded servo information, the method comprising the steps of:

determining a servo bandwidth frequency of the disk drive device;

measuring a noise signal in the servo control, the noise signal having a frequency equal to the servo bandwidth frequency;

performing a digital signal processing technique to complexly subtract the noise signal from correction signal information obtained at an open loop gain junction at the servo bandwidth frequency;

performing a Bode plot analysis of gain versus frequency of the servo control after the step of complex subtraction; and adjusting the gain of the servo control until the gain of the servo control at the servo bandwidth frequency equals zero dB in the Bode plot.

9. A method for automatically calibrating gain parameters of a common servo control for a computer disk drive device having a plurality of disk surfaces the servo control including embedded servo information consisting of paired A and B offset burst and a track position detector, the method comprising the steps of:

encoding a series of AB bursts on at least one calibration track on at least one of the disk surfaces of the disk drive device in accordance with a known off center pattern signal having a preselected frequency;

encoding servo correction number information on the calibration track to compensate for the off center pattern of the AB bursts;

decoding the AB bursts and servo correction number information of the calibration track during a revolution of the one of the disk surfaces;

summing signal information derived from the decoding of the AB bursts with signal information derived from the decoding of the servo correction number information to generate a correction signal;

performing a digital signal processing technique on the correction signal to detect a residual signal having the frequency of the off center pattern signal;

adjusting the gain of the track position detector to minimize the magnitude of the residual signal;

determining a servo bandwidth frequency of the disk drive device;

measuring the gain of the servo control including the one of the disk surfaces at the frequency of the servo bandwidth after the adjusting of the gain of the track position detector;

thereafter measuring the gain of the servo control in respect of each of the remaining disk surfaces, one disk surface at a time, in sequence, at the frequency of the servo bandwidth;

adjusting the gain of the track position detector in respect of each of the remaining disk surfaces, one disk surface at a time, in sequence, such that the servo control gains, as measured in respect of each of the remaining disk surfaces, at the frequency of the servo bandwidth, are equal to the gain of the servo control including the one of the disk surfaces at the frequency of the servo bandwidth; and thereafter, adjusting the gain of the servo control, in respect of each of the disk surfaces, until the gain of the servo control, in respect of each of the disk surfaces, equals one at the servo bandwidth frequency.

10. In a servo control loop of a computer disk drive, the servo control loop including embedded servo position information and a track position detector receiving the servo position information and producing an output signal derived from the servo position information, a device for adjusting and calibrating the gain of the track position detector, which device comprises:

a TPDCAL signal generator coupled to an output of the track position detector to adjust the magnitude of the track position detector output signal; and a calibration track on a disk surface of the computer disk drive, the calibration track including embedded servo position information comprising AB bursts encoded off set from the centerline of the calibration track in accordance with a known pattern signal of a preselected frequency and servo correction number information to correct the AB burst off set;

the TPDCAL signal generator operating to determine a residual signal at the frequency of the known pattern signal in a correction signal derived from a summation of decoded AB burst and servo correction number signals from the calibration track and to generate a TPDCAL signal for adjusting the magnitude of the track position detector output signal to minimize the magnitude of the residual signal.

11. In a servo control loop of a computer disk drive, the servo control loop having a servo bandwidth frequency and including embedded servo position information and a correction signal output device coupled to the disk drive for controlling the position of a head over the centerline of a track within the disk drive, a device for adjusting and calibrating the gain of the servo control loop, which device comprises:

a LOOPCAL signal generator coupled to the correction signal output device to adjust the magnitude of the output signal of the correction signal output device, a noise detector for detecting noise signal component information of the output signal at the frequency of the servo bandwidth;

an open loop gain junction in the servo control loop to provide open loop gain parameters for the servo control loop at the servo bandwidth frequency minus the noise signal component information, the LOOPCAL generator operating to determine gain of the servo control loop at the servo bandwidth frequency from the open loop gain parameters and to generate a LOOPCAL signal to adjust the magnitude of the output signal to a value at which the gain of the servo control loop at the servo bandwidth frequency equals one.

* * * * *